Patented June 5, 1951

2,555,943

UNITED STATES PATENT OFFICE 2,555,943

DIHALO-4-(ALIPHATIC TERTIARYAMINO-ALKYLAMINO)QUINOLINES

Alexander R. Surrey, Albany, N. Y., assignor to Sterling Drug Inc., Wilmington, Del., a corporation of Delaware No Drawing. Application June 28, 1947, Serial No. 757,935

8 Claims. (Cl. 260—283)

This invention relates to dihalo-4-tertiary-aminoalkylaminoquinolines. More specifically, these compounds are those containing halogen at the 5- and 6-, 5- and 8-, or 6- and 8- positions.

I have found that dihalo-4-(aliphatic tertiaryaminoalkylamino)quinolines, wherein the halogen atoms are at two of the positions numbered 5, 6 and 8 of the quinoline nucleus, exhibit marked antiseptic properties. The aliphatic tertiaryaminoalkyl group is understood to include groups such as: 5-diethylamino-2-pentyl, 3-diethylamino-2-hydroxypropyl, 3-diethylaminopropyl, 2-diethylaminoethyl, 4-dimethylaminobutyl, 3-N-piperidylpropyl, 2-N-morpholinylethyl, 3 - (2 - methyl - N - piperidyl)propyl, 2-(2-methyl-N-pyrrolidyl)ethyl, 2-di-n-butylaminoethyl, and the like.

The dihalo-4-(aliphatic tertiary-aminoalkylamino)-quinolines of my invention are prepared by heating a mixture of one mole of the appropriate 4-chloroquinoline containing halogen atoms at two of the positions 5, 6 and 8 with two moles of an aliphatic tertiary-aminoalkyl-amine either alone or in the presence of phenol. Thus, 6,8-diiodo-4-(3-N-piperidylpropylamino)-quinoline is obtained from 6,8-diiodo-4-chloro-quinoline and 3-N-piperidylpropylamine; similarly, 5-bromo-8-chloro-4-(4-dimethylamino-butylamino)quinoline is prepared from 4,8-dichloro-5-bromoquinoline and 4-dimethylamino-butylamine.

My invention further comprises new and useful intermediates, such as the dihalo-4-hydroxy-quinolines and trihaloquinolines described below. These intermediate dihalo-4-hydroxy-quinolines and trihaloquinolines can be prepared by the following general procedure: (1) condensation of the appropriate dihaloaniline (I) with ethyl oxalacetate (H₅C₂OOC.CO.CH₂.COOC₂H₅)

(II) to yield the corresponding anil,

(III), wherein X and X₁ are halogen atoms; (2) cyclization of III to yield a 2-carbethoxy-dihalo-4-hydroxyquinoline (IV); (3) hydrolysis of IV to produce the corresponding 2-carboxy-dihalo-4-hydroxyquinoline (V); (4) decarboxylation of V to give a dihalo-4-hydroxyquinoline (VI) and (5) halogenation of VI to yield the trihaloquinoline (VII). Thus, when I is a 2,5-dihaloaniline, a 4,5,8-trihaloquinoline is obtained; when I is a 2,4-dihaloaniline, a 4,6,8-trihaloquinoline is formed; but, when I is a 3,4-dihaloaniline, an isomeric mixture of a 4,5,6-trihalo- and a 4,6,7-trihaloquinoline is produced. This mixture of isomeric trihaloquinolines can be separated by fractional crystallization. More specifically, when I is 2,5-dichloroaniline or 2,4-dichloroaniline, there is formed, when a chlorinating agent is used in step (5), 4,5,8-trichloroquinoline and 4,6,8-trichloroquinoline, respectively; and when I is 3,4-dichloroaniline, isomeric 4,5,6-trichloro-quinoline and 4,6,7-trichloroquinoline are both produced.

Other trihaloquinolines that may be prepared by the above general method include the following: 4,8-dichloro-5-bromoquinoline, 4-chloro-6-bromo-8-iodoquinoline, 4-chloro-6,8-dibromo-quinoline, 4-chloro-6,8-diiodoquinoline, 4,5,8-tribromoquinoline and the like. In addition, the corresponding dihalo - 4 - hydroxyquinolines, which form part of my invention, include such specific compounds as: 4-hydroxy-5-bromo-8-chloroquinoline, 4-hydroxy-6-bromo-8-iodoquin-oline, 4-hydroxy-6,8-dibromoquinoline, 4-hydroxy-6,8-diiodoquinoline, and the like.

My invention is further described as follows: however, it is to be understood that the invention is not limited to any specific embodiments set forth but rather is defined by the appended claims.

A. 2-carbethoxy-dihalo-4-hydroxyquinolines.—These compounds are prepared by the following general procedure which includes condensing the appropriate dihaloaniline with ethyl oxalacetate and cyclizing the resulting anil (see III above); viz., a solution of 0.5 mole of ethyl oxalacetate and 0.8 mole of the appropriate dihaloaniline in about 350 ml. of glacial acetic acid is stirred for four hours at 40–50° C. and then allowed to stand at room temperature for about sixteen hours. The solution is poured into ice water, neutralized with 35% sodium hydroxide solution, and extracted with ether. The ether extract is washed with about 1.4 liters of 0.5 N hydrochloric acid and about 1.4 liters of 0.5 N sodium hydroxide (each in four portions) and dried over anhydrous potassium carbonate. After removal of the ether by distillation, the residual oil is added to about 780 ml. of mineral oil at 250° C. over a period of about ten to twelve minutes and stirring is continued at 250° C. for about five minutes longer. Practically the theoretical amount of ethyl alcohol which is formed during the cyclization of the anil is collected by condensation of the evolved vapors. The reaction mixture is allowed to cool to 70° C. with stirring, and the solid product is collected, washed with petroleum ether and dried.

Benzene can be substituted for glacial acetic acid as the solvent in the procedure just described. The benzene is removed by distillation after completion of the anil formation and the ring closure can be effected on the resulting residue as such or after purification as described above. Further, other inert high boiling solvents can be substituted for mineral oil in the ring closure step. Such solvents include diphenyl ether, mixtures of diphenyl ether and diphenyl or other high boiling hydrocarbons or ethers.

By using the procedures described in the immediately preceding paragraphs, there may be obtained the following compounds: 2-carbethoxy-5,8-dichloro-4-hydroxyquinoline, M. P. 153-4° C. (this and subsequent melting points are uncorrected) from 2,5-dichloroaniline; 2-carbethoxy-6,8-dichloro-4-hydroxyquinoline, M. P. 147.5-8.5° C. from 2,4-dichloroaniline; and from 3,4-dichloroaniline a mixture of 2-carbethoxy-5,6-dichloro-4-hydroxyquinoline and 2-carbethoxy-6,7-dichloro-4-hydroxyquinoline which, instead of being separated at this stage, are conveniently carried through to the trichloroquinoline stage (see below) as a mixture. Other compounds that can be prepared in the manner generally described above include: 2-carbethoxy-5,8-dibromo-4-hydroxyquinoline from 2,5-dibromoaniline, 2-carbethoxy-6,8-diiodo-4-hydroxyquinoline from 2,4-diiodoaniline, 2-carbethoxy-5-bromo-8-chloro-4-hydroxyquinoline from 2-chloro-5-bromoaniline and 2-carbethoxy-6-bromo-8-iodo-4-hydroxy-quinoline from 2-iodo-4-bromoaniline.

B. *2-carboxy-dihalo - 4 - hydroxyquinolines.*—The esters described under A are hydrolyzed in quantitative yields to the corresponding acids with dilute aqueous sodium hydroxide solution according to the following general procedure: Forty-five grams of a 2-carbethoxy-dihalo-4-hydroxyquinoline is refluxed for two hours with 53 ml. of 35% sodium hydroxide solution and about 400 ml. of water. The solution is diluted with about 300 ml. of hot water and acidified, while being stirred, with dilute hydrochloric acid. The solid is collected, washed with water and dried at 100° C. Purification of the crude acid product is effected by re-precipitation from warm dilute aqueous alkali with hydrochloric acid followed by digestion with warm alcohol. In such a manner are obtained the following acids: 2-carboxy-5,8-dichloro-4-hydroxyquinoline, M. P. 260-1° C.; 2-carboxy-6,8-dichloro-4-hydroxyquinoline, M. P. 254-5° C.; a mixture of 2-carboxy-5,6-dichloro-4-hydroxyquinoline and 2 - carboxy - 6,7 - dichloro - 4 - hydroxyquinoline (from the mixture of corresponding esters); and the like.

C. *Dihalo-4-hydroxyquinolines.* — The acids described under B are decarboxylated according to the following general procedure: The crude 2-carboxy-dihalo-4-hydroxyquinoline, as described under B, is added with stirring to about 200 ml. of mineral oil (or other suitable high boiling inert solvent, such as diphenyl ether, mixtures of diphenyl ether and diphenyl, etc.) at temperatures ranging from 240 to 270° C. The temperature is kept at 270° C. for an additional five minutes and then allowed to drop to 90° C. The separated solid is collected, washed with petroleum ether and dried at 100° C. Purification of the resultant crude dihalo-4-hydroxyquinoline is effected by re-precipitation from a dilute aqueous sodium hydroxide solution with a saturated aqueous sodium bicarbonate solution. Using this procedure, the following 4-hydroxyquinolines are obtained: 5,8-dichloro-4-hydroxyquinoline, M. P. 256-7° C.; 6,8-dichloro-4-hydroxyquinoline, M. P. 309-11° C.; a mixture of 5,6-dichloro-4-hydroxyquinoline and 6,7-dichloro-4-hydroxyquinoline; 5,8-dibromo-4-hydroxyquinoline; 6,8-diiodo-4-hydroxyquinoline; 5-bromo-8-chloro-4-hydroxyquinoline; 6-bromo-8-iodo-4-hydroxyquinoline; and the like.

D. *Trihaloquinolines.*—These trihaloquinolines can conveniently be prepared by the following general method: One part of the crude dihalo-4-hydroxyquinoline, as described under C, is refluxed in approximately three parts of phosphorus oxychloride (added in two portions) for one to two hours. Most of the excess oxychloride is removed by distilling under reduced pressure and the residue is poured into ice-water. The mixture is made alkaline with ammonium hydroxide and the product is taken up in chloroform. After removal of the chloroform, the solid residue of crude trihaloquinoline is purified by crystallization from alcohol or some other suitable solvent as determined by trial. Thus, in such a manner are prepared: 4,5,8-trichloroquinoline, M. P. 140-1° C.; 4,6,8-trichloroquinoline, M. P. 168-9° C.; 4,5,6-trichloroquinoline (see below for separation from 4,6,7-isomer), M. P. 121.5-2.5° C.; 4-chloro-5,8-dibromoquinoline; 4-chloro-6,8-diiodoquinoline; 4,8-dichloro-5-bromoquinoline; 4-chloro-6-bromo-8-iodoquinoline; and the like. When phosphorus tribromide is substituted for phosphorus oxychloride in the above procedure, the corresponding 4-bromo compounds are obtained.

*Isomer separation.*—A mixture of 51 g. of 4,5,6- and 4,6,7-trichloroquinolines is recrystallized from 250 ml. of benzene to yield 16 g. of material, M. P. 146-9° C. An additional 2 g., M. P. 115-138° C. is obtained from the filtrate on standing. The two fractions are combined and recrystallized from benzene and then from petroleum ether (B. P. 50-60° C.) to give 14.5 g. of 4,6,7-trichloroquinoline as colorless needles of M. P. 154-5° C. The other isomer, 4,5,6-trichloroquinoline, M. P. 121.5-2.5° C. is obtained by evaporating to dryness the original benzene filtrate and then repeatedly recrystallizing the resulting residue from alcohol and from petroleum ether (B. P. 50-60° C.).

E. *Dihalo-4-(aliphatic tertiary-aminoalkylamino)-quinolines.*—These compounds can be prepared by either of the two following general methods:

Procedure (1): A mixture of 0.25 mole of a trihaloquinoline, as described under D, and 0.5 mole of an aliphatic tertiary-aminoalkylamine is heated with stirring and refluxing for about seven hours at 160-180° C. (inside temperature). Since the reaction is exothermic, the temperature of the reaction mixture is raised slowly at first to prevent a sudden, unduly high rise in temperature.

The hot reaction mixture is poured into about 300-350 ml. of 50% acetic acid solution (less acid can be used provided enough is present to dissolve completely the oil reaction mixture) and made alkaline with 35% sodium hydroxide solution. Toward the end of the neutralization, a layer of ether is added and, after neutralization has been completed, the alkaline mixture is extracted several times with ether or chloroform. The combined extracts are dried over anhydrous potassium carbonate and the solvent is then removed by distillation. The residue is heated at about 160–170° C. (bath temperature) to recover by distillation the excess aliphatic tertiary-aminoalkylamine. On standing, the crude residual oil may crystallize. This crude base can be purified by distillation under low pressures (about 160–200° C. and 0.002–0.1 mm.) if an oil, or by recrystallization if a solid. The distillate, which is collected over a wide range, may solidify on standing and can be recrystallized from various solvents, such as petroleum ether, benzene, ether in some instances, combinations of solvents such as benzene-petroleum ether, etc. If it does not solidify, further purification is effected by a second distillation.

Procedure (2): A mixture of 0.288 mole of a trihaloquinoline, as described under D, 0.576 mole of an aliphatic tertiary-aminoalkylamine, about 0.61 mole of phenol, and 0.02 g. of sodium iodide is heated with stirring and refluxing at an inside temperature of about 160° C. for about fifteen hours.

The hot phenol melt is poured into an excess (about 500–600 ml.) of 35% sodium hydroxide solution with stirring. The alkaline mixture is extracted exhaustively with ether and then the ether extract is extracted with 3 N hydrochloric acid solution. The acidic aqueous extract is made neutral to Congo red paper with solid sodium acetate and washed twice with ether. The resulting aqueous solution is made alkaline by the addition of 35% sodium hydroxide solution and the oil that separates is extracted exhaustively with ether. After being dried over anhydrous potassium carbonate, the combined ether extracts are evaporated and the residual oil is heated in vacuo at a bath temperature of about 180° C. and a pressure of 0.5 mm. to remove by distillation any unreacted aliphatic tertiary-aminoalkylamine. The residual dihalo-4-(aliphatic tertiary-aminoalkylamino)-quinoline is purified as in Procedure (1).

By the procedures just described there can be obtained the following compounds: 5,8-dichloro-4 - (3 - diethylamino - 2 - hydroxypropylamino)-quinoline, M. P. 102.5–3.5° C. (recrystallized from petroleum ether of B. P. 70–90° C.), using 3-diethylamino-2-hydroxypropylamine as the aliphatic primary-tertiary-diamine; 5,8-dichloro-4 - (5 - diethylamino - 2 - pentylamino) quinoline, B. P. 150–5° C. at 0.001 mm., using 5-diethylamino-2-pentylamine as the diamine; 6,8-dichloro - 4 - (3 - diethylamino - 2 - hydroxypropylamino) quinoline, M. P. 139.5–41° C. (recrystallized from petroleum ether of B. P. 70–90° C.), using 3-diethylamino-2-hydroxypropylamine as the diamine; 6,8-dichloro-4-(5-diethylamino-2-pentylamino) quinoline, M. P. 131–2.5° C. (recrystallized from petroleum ether of B. P. 70–90° C.), using 5-diethylamino-2-pentylamine as the diamine; and 5,6-dichloro-4-(3-diethylamino-2-hydroxypropylamino) quinoline, M. P. 114.5–5.5° C. (recrystallized from petroleum ether of B. P. 50–60° C.), using 3-diethylamino-2-hydroxypropylamine as the diamine. The following compounds may be similarly prepared: 5,8-dibromo-4-(3-N-piperidylpropylamino) quinoline, from 4-chloro-5,8-dibromoquinoline and 3-N-piperidylpropylamine; 6,8-diiodo-4-(2-di-n-butylaminoethylamino) quinoline, from 4-chloro-6,8-diiodoquinoline and 2-di-n-butylaminoethylamine; 5-bromo - 8 - chloro - 4 - (4 - dimethylaminobutylamino) quinoline, from 4,8 - dichloro - 5 - bromoquinoline and 4-dimethylaminobutylamine; 6-bromo - 8 - iodo - 4 - (3 - N - piperidylpropyl - amino) quinoline, from 4-chloro-6-bromo-8-iodoquinoline and 3-N-piperidylpropylamine; and 6,8 - difluoro - 4 - (3 - diethylaminopropylamino) quinoline, from 4-chloro-6,8-difluoroquinoline and 3-diethylaminopropylamine.

The corresponding 3-methylquinoline compounds are obtained when, in place of ethyl oxalacetate, ethyl methyloxalacetate

is used. Thus, when the above series of reactions is carried out using in the first step ethyl methyloxalacetate and 2,5-dibromoaniline, the following respective compounds are ultimately obtained in subsequent steps: 2-carbethoxy-3-methyl-4-hydroxy-5,8-dibromoquinoline; 2-carboxy-3-methyl-4-hydroxy-5,8-dibromoquinoline; 3-methyl-4-hydroxy-5,8-dibromoquinoline; and 3-methyl-4-chloro-5,8-dibromoquinoline. Condensation of the 3-methyl-trihaloquinoline with an aliphatic tertiary-aminoalkylamine yields the corresponding 3-methyl-trihalo-4-(aliphatic tertiary-aminoalkylamino)-quinoline. Thus, condensation of 3-methyl-4-chloro-5,8-dibromoquinoline with 4-dimethylaminobutylamine yields 3-methyl-5,8-dibromo-4-(4-dimethylaminobutylamino) quinoline.

The basic dihalo-4-(aliphatic tertiary-aminoalkylamino) quinolines of my invention have the same properties, as pharmaceuticals, whether employed as the free bases, which are the active compounds, or—and often more conveniently—as their salts with non-toxic inorganic or organic acid; thus it will be understood that the free bases and their salts are equivalents with respect to the instant invention. Among the acids which may be so employed to form the salts are phosphoric, sulfuric, hydrochloric, benzoic, sulfamic, tartaric, citric, and the like.

I claim:

1. A compound selected from the group consisting of a dihalo-4-(aliphatic tertiary-aminoalkylamino)-quinoline, wherein the halogen atoms are at two of the positions numbered 5, 6 and 8 of the quinoline nucleus and acid addition salts thereof.

2. A dihalo-4-hydroxyquinoline wherein the halogen atoms are at two of the positions numbered 5,6 and 8.

3. A trihaloquinoline wherein one halogen atom is at the 4-position and the other two halogen atoms are at two of the positions 5, 6 and 8.

4. A compound selected from the group consisting of a 5,8-dihalo-4-(aliphatic tertiary-aminoalkylamino)-quinoline and acid addition salts thereof.

5. A compound selected from the group consisting of a 6,8-dihalo-4-(aliphatic tertiary-aminoalkylamino)-quinoline and acid addition salts thereof.

6. A compound selected from the group consisting of 5,8-dichloro-4-(5-diethylamino-2-pentylamino) quinoline and acid addition salts thereof.

7. A compound selected from the group consisting of 5,8-dichloro-4-(3-diethylamino-2-hydroxypropylamino) quinoline and acid addition salts thereof.

8. A compound selected from the group consisting of 6,8-dichloro-4-(5-diethylamino-2-pentylamino) quinoline and acid addition salts thereof.

ALEXANDER R. SURREY.

(References on following page)

REFERENCES CITED

The following references are of record in the file of this patent:

UNITED STATES PATENTS

| Number | Name | Date |
|---|---|---|
| 2,411,670 | Senn | Nov. 26, 1946 |

FOREIGN PATENTS

| Number | Country | Date |
|---|---|---|
| 388,087 | Great Britain | Feb. 23, 1933 |
| 683,692 | Germany | Nov. 13, 1939 |

OTHER REFERENCES

Wiselogle, Survey of Antimalarial Drugs, 1941–1945 (J. W. Edwards, Ann Arbor, 1946), vol. II, pp. 1153 and 1159.

Surrey et al., J. Amer. Chem. Soc. 68, pp. 113–116 (Jan. 1946).

Steck et al., J. Amer. Chem. Soc. 68, pp. 129–132 (Jan. 1946).

Surrey et al., J. Amer. Chem. Soc. 68, pp. 1244–1246 (July 1946).